United States Patent
Mastrocola et al.

(10) Patent No.: US 10,913,435 B2
(45) Date of Patent: Feb. 9, 2021

(54) HYDRAULIC BRAKING SYSTEM AND METHOD

(71) Applicant: Goodrich Corporation, Charlotte, NC (US)

(72) Inventors: Naison E. Mastrocola, Goshen, CT (US); Tyler Arsenault, Dayton, OH (US)

(73) Assignee: Goodrich Corporation, Charlotte, NC (US)

( * ) Notice: Subject to any disclaimer, the term of this patent is extended or adjusted under 35 U.S.C. 154(b) by 168 days.

(21) Appl. No.: 16/146,350

(22) Filed: Sep. 28, 2018

(65) Prior Publication Data
US 2020/0101951 A1 Apr. 2, 2020

(51) Int. Cl.
*B60T 8/17* (2006.01)
*B60T 8/30* (2006.01)
*B60T 8/174* (2006.01)
*B60T 15/14* (2006.01)
*B60T 13/66* (2006.01)

(52) U.S. Cl.
CPC .......... *B60T 8/1703* (2013.01); *B60T 8/174* (2013.01); *B60T 8/306* (2013.01); *B60T 15/14* (2013.01); *B60T 13/662* (2013.01)

(58) Field of Classification Search
CPC ........ B60T 8/1703; B60T 8/174; B60T 8/306; B60T 13/662; B60T 15/14
See application file for complete search history.

(56) References Cited

U.S. PATENT DOCUMENTS

| | | | |
|---|---|---|---|
| 4,946,229 A * | 8/1990 | Deno | B60T 13/406 303/20 |
| 6,499,577 B2 | 12/2002 | Kitamoto et al. | |
| 7,475,537 B2 | 1/2009 | Spickard | |
| 8,197,016 B2 | 6/2012 | Metzger, Jr. | |
| 9,347,200 B2 * | 5/2016 | Hennemann | F04B 49/08 |
| 2010/0276989 A1 | 11/2010 | Metzger, Jr. | |
| 2012/0216517 A1 | 8/2012 | Peterson | |
| 2013/0057051 A1 * | 3/2013 | Matsuura | B60K 6/445 303/3 |
| 2013/0125540 A1 | 5/2013 | Vainonen | |

(Continued)

FOREIGN PATENT DOCUMENTS

CN 206856694 U 1/2018

OTHER PUBLICATIONS

EP search report for EP19200541.1 dated Feb. 13, 2020.

*Primary Examiner* — Melody M Burch
(74) *Attorney, Agent, or Firm* — Getz Balich LLC

(57) ABSTRACT

A braking system includes a brake actuator, a control valve, a control assembly, at least one pressure sensor, and at least one flow sensor. The control valve is disposed to direct hydraulic fluid to the brake actuator at a rate corresponding to a magnitude of a control signal. The at least one flow sensor and the at least one pressure sensor, in communication with the control assembly, are disposed between the control valve and the brake actuator and configured to measure a respective flow rate and pressure of the hydraulic fluid to the brake actuator. The control assembly is configured to ramp the control signal from a first signal level to a second signal level at a predetermined rate of change. The control assembly is configured to determine a flow-based position of the brake actuator based on the flow rate.

20 Claims, 3 Drawing Sheets

(56) References Cited

U.S. PATENT DOCUMENTS

2013/0259620 A1* 10/2013 Shirao ................. E02F 3/36
　　　　　　　　　　　　　　　　　　　　　414/685
2014/0081512 A1　　3/2014 Fugiel

* cited by examiner

HYDRAULIC BRAKING SYSTEM AND METHOD

BACKGROUND

1. Technical Field

This disclosure relates generally to braking systems, and more particularly to hydraulic braking systems for use in a vehicle.

2. Background Information

Historically, pressure-only feedback control systems for aircraft brake control have resulted in a phenomenon referred to as "brake fill." During brake fill, a control valve (e.g., an electro-hydraulic servo valve (EHSV)) is directing fluid into a hydraulic brake actuator but the brake actuator has not yet established sufficient hydraulic fluid volume to build hydraulic pressure in the system. As a result, during brake fill there is no palpable feedback from the hydraulic pressure sensor to a control system for determining when contact will be made between the brake piston of the hydraulic actuator and the heat sink (e.g., a brake pad or disc brake stack of a brake assembly).

As one of ordinary skill in the art would appreciate, this brake fill period presents a number of challenges during braking operations. For example, during a pilot-initiated braking operation, the resulting brake fill period will increase the amount of time between initiation of the pilot-initiated braking command and contact between the brake piston of the hydraulic actuator and the heat sink. This brake fill period may also be referred to as a "dead zone" because a braking operation has been initiated but no braking action has occurred. Further, the rapid increase in hydraulic pressure once sufficient fluid volume has accumulated in the hydraulic actuator may result in inadequate controller performance and excessive braking force. Pressure-only feedback to a control system may not enable the control system response to adequately respond to the rapidly increasing hydraulic pressure, thereby permitting a hydraulic pressure overshoot beyond the commanded brake actuator pressure (i.e., integrator windup).

SUMMARY

According to an aspect of the present disclosure, a method of braking initiation for a hydraulic braking system is provided. A control signal is applied to a control valve and the control signal is ramped from a first signal level to a second signal level at a predetermined rate of change. Hydraulic fluid is directed, with the control valve in response to the control signal, to a brake actuator. A pressure and a flow rate of the hydraulic fluid are measured. A flow-based position of the brake actuator is determined based on the flow rate of the hydraulic fluid. The second signal level is determined based on at least one of a predetermined stall flow rate threshold and a predetermined stall pressure threshold of the hydraulic fluid.

In the alternative or additionally thereto, in the foregoing aspect, a maximum travel position of the brake actuator is determined corresponding to the flow-based position of the brake actuator when the control signal is substantially equal to the second signal level.

In the alternative or additionally thereto, in the foregoing aspect, the maximum travel position of the brake actuator is stored.

In the alternative or additionally thereto, in the foregoing aspect, the brake actuator is repositioned to a zero torque position based on the maximum travel position.

In the alternative or additionally thereto, in the foregoing aspect, the second signal level is defined by the control signal at a time the flow rate decreases below the predetermined stall flow rate threshold and the pressure is above the predetermined stall pressure threshold.

In the alternative or additionally thereto, in the foregoing aspect, determining the flow-based position of the brake actuator includes integrating and normalizing the flow rate of the hydraulic fluid.

According to another aspect of the present disclosure, a braking system includes a brake actuator, a control valve, a control assembly, at least one pressure sensor, and at least one flow sensor. The control valve is disposed to direct hydraulic fluid to the brake actuator at a rate corresponding to a magnitude of a control signal. The at least one flow sensor and the at least one pressure sensor, in communication with the control assembly, are disposed between the control valve and the brake actuator and configured to measure a respective flow rate and pressure of the hydraulic fluid to the brake actuator. The control assembly is configured to ramp the control signal from a first signal level to a second signal level at a predetermined rate of change. The second signal level is based on one or more of a predetermined stall flow rate threshold and a predetermined stall pressure threshold of the hydraulic fluid. The control assembly is configured to determine a flow-based position of the brake actuator based on the flow rate.

In the alternative or additionally thereto, in the foregoing aspect, the control assembly includes at least one controller.

In the alternative or additionally thereto, in the foregoing aspect, the control assembly is configured to determine a maximum travel position of the brake actuator corresponding to the flow-based position of the brake actuator when the control signal is substantially equal to the second signal level.

In the alternative or additionally thereto, in the foregoing aspect, the control assembly is configured to store the maximum travel position of the brake actuator.

In the alternative or additionally thereto, in the foregoing aspect, the control assembly is configured to reposition the brake actuator to a zero torque position based on the maximum travel position.

In the alternative or additionally thereto, in the foregoing aspect, the second signal level is defined by the control signal at a time the flow rate decreases below the predetermined stall flow rate threshold and the pressure is above the predetermined stall pressure threshold.

In the alternative or additionally thereto, in the foregoing aspect, the control assembly is configured to integrate and normalize the flow rate.

According to another aspect of the present disclosure, a vehicle includes at least one brake assembly and a braking system in communication with the at least one brake assembly. The braking system includes brake actuator, a control valve, a control assembly, at least one pressure sensor, and at least one flow sensor. The control valve is disposed to direct hydraulic fluid to the brake actuator at a rate corresponding to a magnitude of a control signal. The at least one flow sensor and the at least one pressure sensor, in communication with the control assembly, are disposed between the control valve and the brake actuator and configured to measure a respective flow rate and pressure of the hydraulic fluid to the brake actuator. The control assembly is configured to ramp the control signal from a first signal level to a second signal level at a predetermined rate of change. The second signal level is based on one or more of a predetermined stall flow rate threshold and a predetermined stall pressure threshold of the hydraulic fluid. The control assembly is configured to determine a flow-based position of the brake actuator based on the flow rate.

In the alternative or additionally thereto, in the foregoing aspect, the control assembly includes at least one controller.

In the alternative or additionally thereto, in the foregoing aspect, the control assembly is configured to determine a maximum travel position of the brake actuator corresponding to the flow-based position of the brake actuator when the control signal is substantially equal to the second signal level.

In the alternative or additionally thereto, in the foregoing aspect, the control assembly is configured to store the maximum travel position of the brake actuator.

In the alternative or additionally thereto, in the foregoing aspect, the control assembly is configured to reposition the brake actuator to a zero torque position based on the maximum travel position.

In the alternative or additionally thereto, in the foregoing aspect, the second signal level is defined by the control signal at a time the flow rate decreases below the predetermined stall flow rate threshold and the pressure is above the predetermined stall pressure threshold.

In the alternative or additionally thereto, in the foregoing aspect, the control assembly is configured to integrate and normalize the flow rate.

The present disclosure, and all its aspects, embodiments and advantages associated therewith will become more readily apparent in view of the detailed description provided below, including the accompanying drawings.

DETAILED DESCRIPTION

Figure 1:
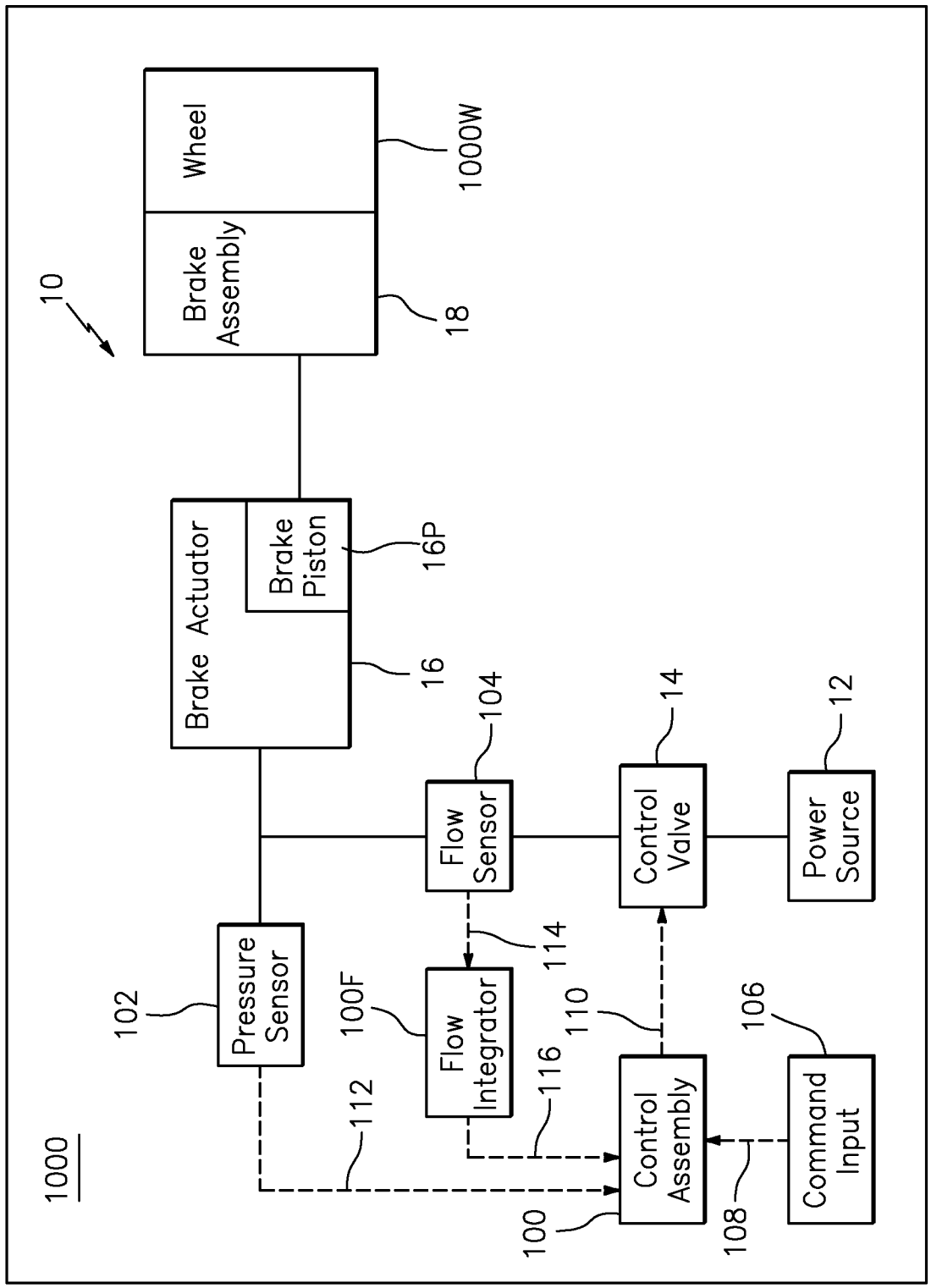
FIG. 1 is a schematic diagram of an exemplary hydraulic braking system according to aspects of the present disclosure.
Figure 2:
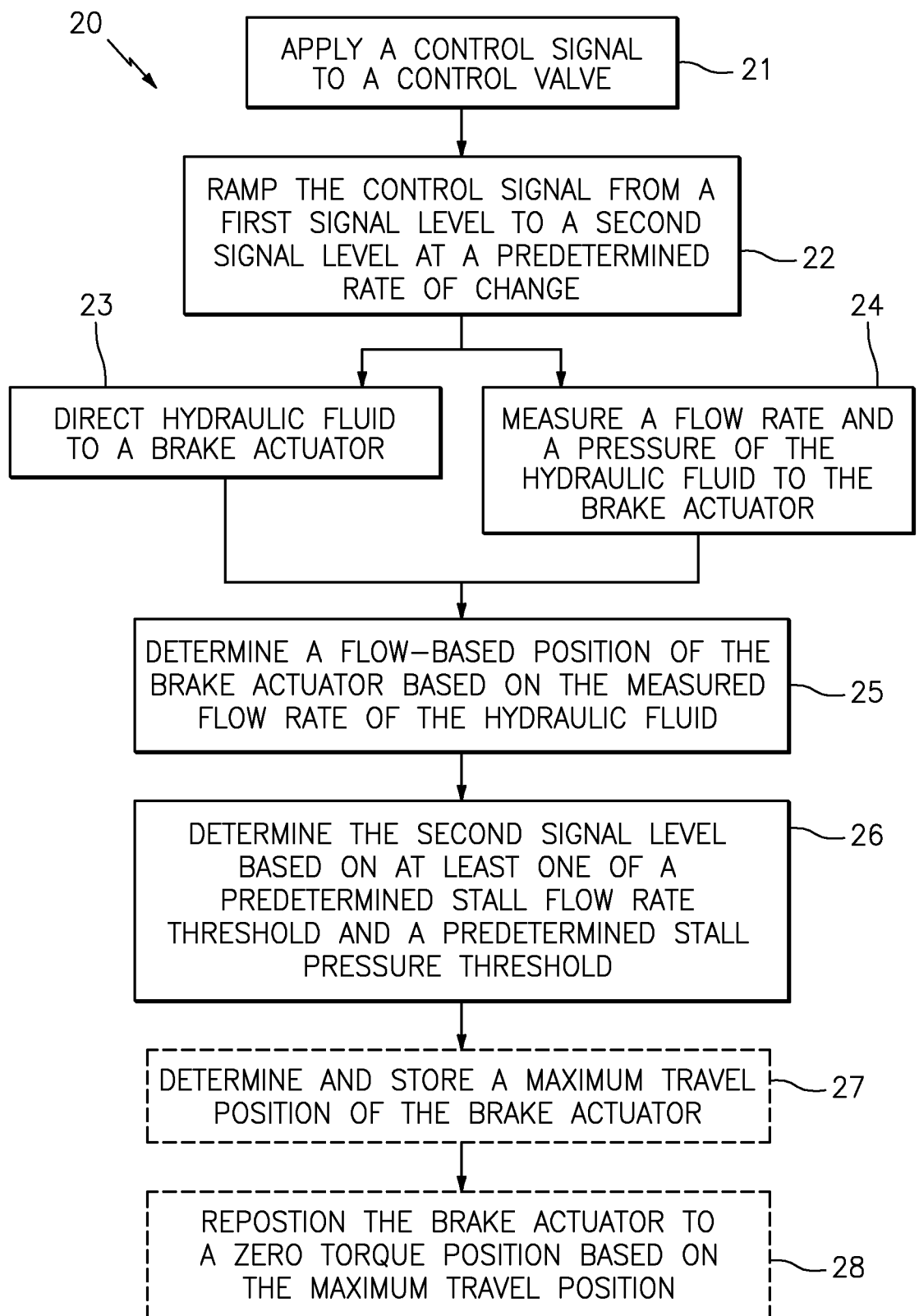
FIG. 2 is a flow diagram of a method of braking initiation for a hydraulic braking system according to aspects of the present disclosure.
Figure 3A:
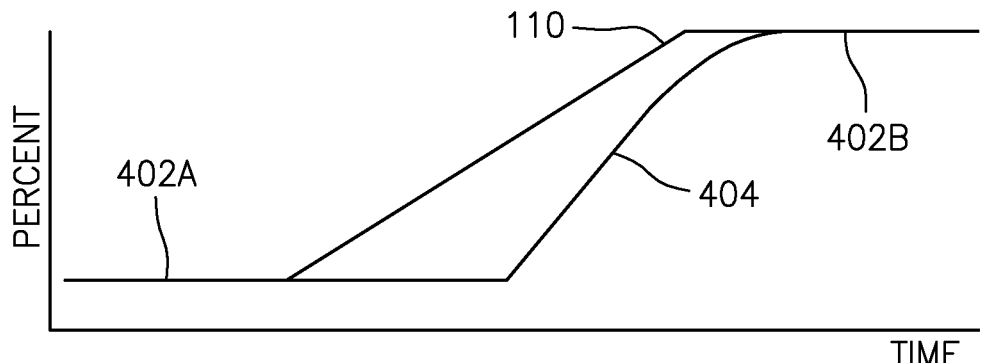
FIG. 3A is a graph illustrating parameters associated with operation of the system of FIG. 1.
Figure 3B:
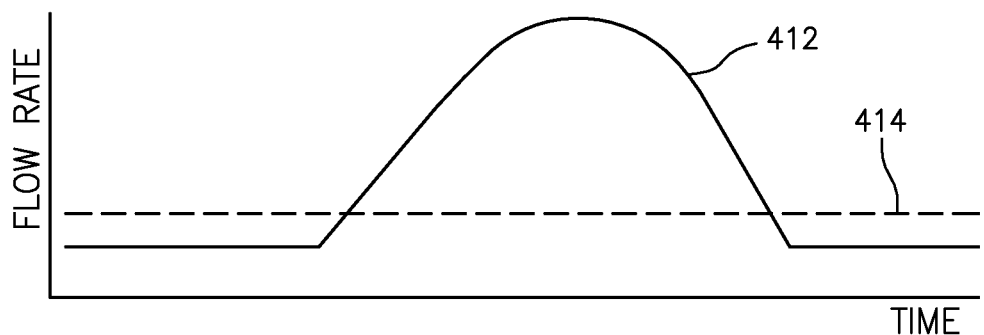
FIG. 3B is a graph illustrating parameters associated with operation of the system of FIG. 1.
Figure 3C:
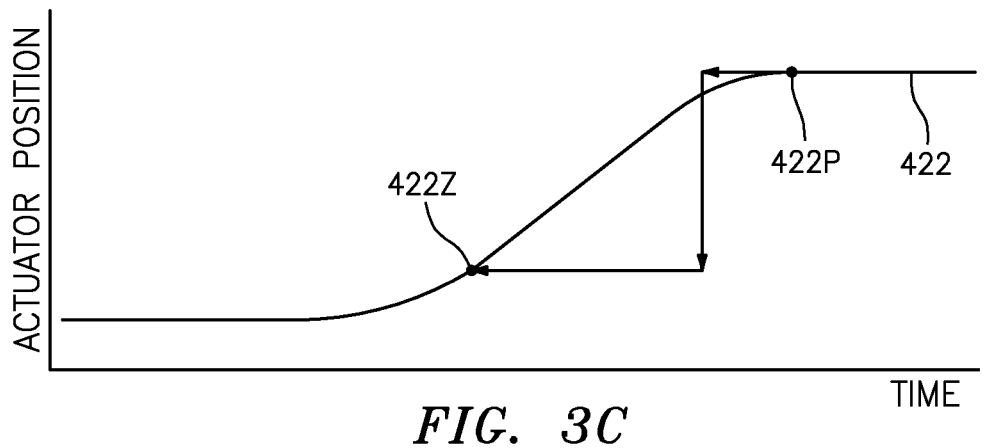
FIG. 3C is a graph illustrating parameters associated with operation of the system of FIG. 1.
Figure 3D:
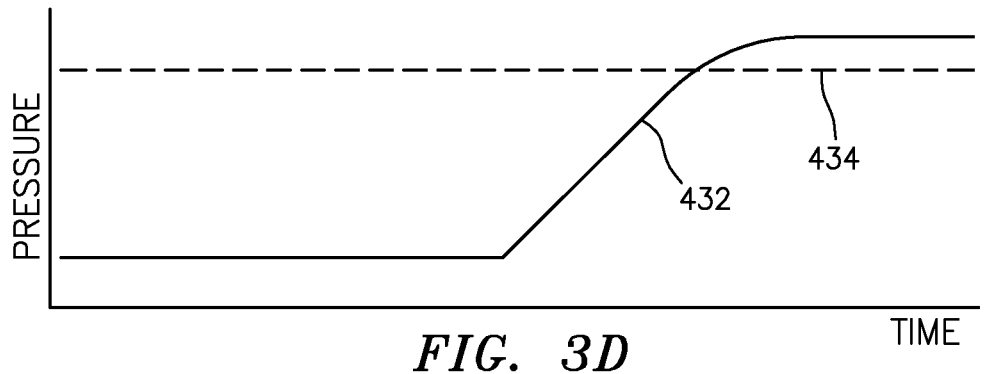
FIG. 3D is a graph illustrating parameters associated with operation of the system of FIG. 1.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, a hydraulic braking system 10 is shown. While the embodiments disclosed herein relate to aircraft hydraulic braking systems, the disclosure is not limited to aircraft hydraulic braking systems and may be used in hydraulic braking systems of any suitable vehicle. Further, the embodiments disclosed herein may be used with any hydraulic actuator and are not limited to use in braking hydraulic actuators. The braking system 10 includes a power source 12, a control valve 14, and a brake actuator 16 including a brake piston 16P. The control valve 14 controls the flow of hydraulic fluid supplied to and from the brake actuator 16 by the power source 12. The brake actuator 16, in turn, effects operation of a brake assembly 18 by extending the brake piston 16P so as to contact and apply a force to the brake assembly 18, thereby applying a braking force (i.e., torque) to a respective wheel 1000W of, for example, an aircraft 1000.

As one of ordinary skill in the art would appreciate, the brake assembly 18 may be configured as a disc brake assembly. In such a configuration, the brake actuator 16 may be positioned adjacent a stack of discs and may be configured to selectively apply a force to the stack in response to a braking operation. Friction that occurs between the discs of the stack, as a result of force applied by, for example, a brake piston 16P of the brake actuator 16, will slow and/or stop the rotation of the respective wheel 1000W of aircraft 1000. Other configurations of brake assemblies may be used, and this disclosure should not be understood to be limited to a particular configuration of brake assembly.

The braking system 10 includes a control assembly 100 configured to control at least a portion of the operation of the braking system 10. Additionally, the control assembly 100 may include at least one controller (not shown). One or more aspects of the control assembly 100 may be performed by one or more of the at least one controller. The braking system 10 includes at least one pressure sensor 102 configured to measure the pressure of the hydraulic fluid supplied to the brake actuator 16 by the control valve 14 and provide a pressure signal 112 (e.g., pressure feedback data) to the control assembly 100. The braking system 10 further includes at least one flow sensor 104 configured to measure the rate of flow of the hydraulic fluid supplied to the brake actuator 16 by the control valve 14 and provide a flow signal 114 (e.g., flow feedback data) to the control assembly 100. While the at least one flow sensor 104 may be described herein as measuring the flow of hydraulic fluid to the brake actuator 16, the at least one flow sensor 104 may also measure the flow of hydraulic fluid from the brake actuator 16 (e.g., while retracting the brake actuator 16 after a braking operation). Both the at least one pressure sensor 102 and the at least one flow sensor 104 may be any conventional pressure or flow sensor, respectively.

The control assembly 100 may be in communication (e.g., signal communication) with one or more of the at least one pressure sensor 102, the at least one flow sensor 104, a flow integrator 100F, the command input 106, the control valve 14, and other aspects of the braking system 10. In some embodiments, one or more of the at least one pressure sensor 102, the at least one flow sensor 104, and the flow integrator 100F may be part of the control assembly 100. The control assembly 100 may include any type of computing device, computational circuit, or any type of process or processing circuit capable of executing a series of instructions that are stored in memory. The control assembly 100 may include any combination of analog and digital components or control signals. The control assembly 100 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the braking system 10 (e.g., the control valve 14) and the stored instructions are not limited to any particular form (e.g., program files, system data, buffers, drivers, utilities, system programs, etc.) provided they can be executed by the control assembly 100. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well as a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the control assembly 100 may be achieved via the use of hardware, software, firmware, or any combination thereof. The control assembly 100 may also include input (e.g., a keyboard, a touch screen, etc.) and output devices (e.g., a monitor, sensor readouts, data ports, etc.) that enable the operator to input instructions, received data, etc.

A flow integrator 100F receives the flow signal 114 from the at least one flow sensor 104. The flow integrator 100F integrates and normalizes the flow signal 114 to determine a flow-based position (i.e., an estimated position of the brake actuator 16 based on known hydraulic fluid flow through the control valve 14) (see, e.g., flow-based position 422 of FIG. 4) and issues a corresponding flow-based position signal 116. As will be described in further detail, the flow-based position signal 116 may be received by the control assembly 100 for applying or adjusting the control signal 110.

Generally describing the function of the braking system 10, operation of a command input 106 (e.g., a brake pedal configured to be actuated by a pilot or an autobrake sequence initiated by an aircraft 1000) system) initiates a braking operation by issuing a command signal 108 (e.g., an electrical signal) configured to communicate a commanded braking force to the control assembly 100. The command signal 108 may be in the form of an analog signal (e.g., a variable electrical current), a digital signal, or any other suitable medium for communicating a commanded braking force. In response to receipt of the command signal 108, the control assembly 100 applies or adjusts a control signal 110 configured to effect operation of the control valve 14 to supply hydraulic fluid to the brake actuator 16. As with the command signal 108, the control signal 110 may be in the form of an analog signal (e.g., a variable electrical current), a digital signal, or any other suitable medium for effecting operation of the control valve 14, which may be the same or a different type of signal as the command signal 108. As will be discussed in further detail, the control assembly 100 may apply or adjust the control signal 110 based on one or more additional signals, such as a pressure signal 112 or a flow-based position signal 116.

Upon receipt of the control signal 110, the control valve 14 operates to supply hydraulic fluid from the power source 12 to the brake actuator 16 at a rate corresponding to a magnitude of the control signal 110 so as to obtain a commanded braking force, which may, for example, correspond to a hydraulic fluid pressure or position (e.g., the flow-based position) of the brake actuator 16. Initially, as the control valve 14 begins to supply hydraulic fluid to the brake actuator 16, the brake actuator 16 experiences a "brake fill" period wherein the control valve 14 is directing fluid into the brake actuator 16 but the brake actuator 16 has not yet established sufficient hydraulic fluid volume to build hydraulic fluid pressure in the system. As a result, actual braking action (i.e., application of braking force) is delayed until the brake fill period is substantially complete. Once the brake actuator 16 has substantially filled with hydraulic fluid and hydraulic fluid pressure has begun to rise appreciably, the brake piston 16P of the brake actuator 16 will make contact with and apply force to the brake assembly 18.

To obtain the commanded braking force corresponding to a hydraulic fluid pressure in the brake actuator 16, the control assembly 100 may apply or adjust the control signal 110 based on one or more of the pressure signal 112 and the flow-based position signal 116 in addition to the command signal 108.

Referring to FIGS. 1-3D, a method 20 of braking initiation for a hydraulic braking system according to aspects of the present disclosure is described. Prior to initiating a braking operation, for example, in anticipation of aircraft landing or taxiing operations, an initialization procedure may be performed. For example, the initialization procedure may be automatically performed by the control assembly 100 when the control assembly 100 is energized in anticipation of aircraft landing. The initialization procedure may be used for determining a minimum control signal required to establish contact between the brake actuator 16 and the brake assembly 18 within a predetermined time period (e.g., an acceptable time to application of braking force for the applicable hydraulic braking system) while preventing or minimizing pressure overshoot (i.e., a hydraulic pressure in excess of the hydraulic pressure corresponding to the command braking force) (hereinafter the "minimum control signal"). The minimum control signal may be stored by the control assembly 100 for use in future operations. For example, the minimum control signal may be used by the control assembly 100 to speed up future initialization procedures or to allow a faster approach to braking.

As will be described in further detail, the initialization procedure may also be used for repositioning the brake actuator 16 to a zero torque position with respect to the brake assembly 18. In a zero torque position, the brake actuator 16 is in contact with the brake assembly 18, but does not generate an appreciable braking force, such that the respective wheel 1000W is effectively un-braked (i.e., in the zero torque position, the brake actuator 16 does not apply a force to the brake assembly 18).

Method 20 will be described with respect to the exemplary parameters as illustrated in FIGS. 3A-3D. Upon commencing the initialization procedure, the control signal 110 is issued by control assembly 100 to the control valve 14 (see Block 21). The control signal 110 is ramped from a first signal level 402A to a second signal level 402B at a predetermined rate of change (see Block 22).

The control valve 14 operates in accordance with the control signal 110 to direct hydraulic fluid to the brake actuator 16 (see Block 23). The at least one flow sensor 104 and the at least one pressure sensor 102 measure a flow rate 412 and a pressure of the hydraulic fluid to the brake actuator 16, respectively (see Block 24). As the brake piston 16P of the brake actuator 16 contacts the brake assembly 18, hydraulic fluid pressure 432 begins to increase appreciably and rod end force 404 (i.e., actual braking force) increases towards commanded braking force (as effected by the control signal 110).

The second signal level 402B may be determined, for example, based on one or more of a predetermined stall flow rate threshold 414 and a predetermined stall pressure threshold 434 of the hydraulic fluid (see Block 26). For example, the second signal level 402B may be defined by the control signal 110 when the flow rate 412 of the hydraulic fluid decreases below the predetermined stall flow rate threshold 414 while the pressure 432 of the hydraulic fluid is above the predetermined stall pressure threshold 434. In some embodiments, the second signal level 402B may be the minimum control signal, while in other embodiments the magnitude of the second signal level 402B may be greater or less than the magnitude of the minimum control signal. In some embodiments, one or more of the predetermined stall flow rate threshold 414 and the predetermined stall pressure threshold 434 may be modified by, for example, the control assembly 100 in response to changing vehicle operating conditions (e.g., hydraulic fluid temperature).

A flow-based position 422 of the brake actuator 16 is determined based on the measured flow rate 412 of the hydraulic fluid (see Block 25). For example, during the ramp from the first signal level 402A to the second signal level 402B, the flow rate 412 is integrated and normalized to obtain a flow-based position 422 of the brake actuator 16.

In some embodiments, the control assembly 100 may determine a maximum travel position 422P of the brake actuator 16 corresponding to the flow-based position 422 of the brake actuator 16 when the control signal 110 is substantially equal to the second signal level 402B (e.g., when the control signal 110 is within an error tolerance of the section signal level 402B based on, for example, the known accuracy of the at least one pressure sensor 102 and/or the at least one flow sensor 104). The control assembly 100 may store the maximum travel position 422P for future reference (see Block 27). The control assembly 100 may store the particular maximum travel position 422P of the brake actuator 16 for a corresponding particular set of conditions (e.g., a braking operation associated with aircraft landing or taxiing) in order to more rapidly approach the known maximum travel position 422P of the brake actuator 16 during a future braking operations having a same or similar set of conditions. For example, the braking system 10 may rapidly approach the known maximum travel position 422P for the particular set of conditions requiring a braking operation, thereby reducing the time of the brake fill period and allowing more rapid contact between the brake piston 16P and the brake assembly 18.

Additionally, in some embodiments, once the maximum travel position 422P of the brake actuator 16 has been determined, the control assembly 100 may reposition the brake actuator 16 to a zero torque position 422Z (see Block 28). The zero torque position 422Z may be determined based on functional considerations of the braking system 10, for example, mechanical properties of the brake assembly 18 (e.g., spring rate of the brake assembly 18, spring rate of one or more return springs of the brake assembly 18, inherent friction and damping in the brake actuator 16, as well as wear, age, and temperature of the brake assembly 18). For example, following an initialization procedure conducted prior to taxiing operations, the brake actuator 26 may be retracted to the zero torque position 422Z based on the maximum travel position 422P. In some embodiments, the control assembly 100 may also determine a new zero torque position. For example, following a braking operation, the control assembly may determine a new zero torque position based on mechanical properties of the brake assembly 18 (e.g., thermal expansion of brake assembly components).

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A method of braking initiation for a hydraulic braking system comprising:
   applying a control signal to a control valve and ramping the control signal from a first signal level to a second signal level at a predetermined rate of change;
   directing hydraulic fluid, with the control valve in response to the control signal, to a brake actuator;
   measuring a pressure and a flow rate of the hydraulic fluid to the brake actuator;
   determining a flow-based position of the brake actuator based on the flow rate of the hydraulic fluid; and
   determining the second signal level based on at least one of a predetermined stall flow rate threshold and a predetermined stall pressure threshold of the hydraulic fluid.

2. The method of claim 1, further comprising determining a maximum travel position of the brake actuator corresponding to the flow-based position of the brake actuator when the control signal is substantially equal to the second signal level.

3. The method of claim 2, further comprising storing the maximum travel position of the brake actuator.

4. The method of claim 2, further comprising repositioning the brake actuator to a zero torque position based on the maximum travel position.

5. The method of claim 1, wherein the second signal level is defined by the control signal at a time the flow rate decreases below the predetermined stall flow rate threshold and the pressure is above the predetermined stall pressure threshold.

6. The method of claim 1, wherein determining the flow-based position of the brake actuator includes integrating and normalizing the flow rate of the hydraulic fluid.

7. A braking system comprising:
   a brake actuator;
   a control valve disposed to direct hydraulic fluid to the brake actuator at a rate corresponding to a magnitude of a control signal;
   a control assembly; and
   at least one flow sensor and at least one pressure sensor in communication with the control assembly, the at least one flow sensor and the at least one pressure sensor disposed between the control valve and the brake actuator and configured to measure a respective flow rate and pressure of the hydraulic fluid to the brake actuator;

wherein the control assembly is configured to ramp the control signal from a first signal level to a second signal level at a predetermined rate of change, the second signal level based on one or more of a predetermined stall flow rate threshold and a predetermined stall pressure threshold of the hydraulic fluid; and wherein the control assembly is configured to determine a flow-based position of the brake actuator based on the flow rate.

8. The braking system of claim 7, wherein the control assembly comprises at least one controller.

9. The braking system of claim 7, wherein the control assembly is configured to determine a maximum travel position of the brake actuator corresponding to the flow-based position of the brake actuator when the control signal is substantially equal to the second signal level.

10. The braking system of claim 9, wherein the control assembly is configured to store the maximum travel position of the brake actuator.

11. The braking system of claim 9, wherein the control assembly is configured to reposition the brake actuator to a zero torque position based on the maximum travel position.

12. The braking system of claim 7, wherein the second signal level is defined by the control signal at a time the flow rate decreases below the predetermined stall flow rate threshold and the pressure is above the predetermined stall pressure threshold.

13. The braking system of claim 7, wherein the control assembly is configured to integrate and normalize the flow rate.

14. A vehicle comprising:
at least one brake assembly; and
a braking system, in communication with the at least one brake assembly, the braking system comprising:
a brake actuator;
a control valve disposed to direct hydraulic fluid to the brake actuator at a rate corresponding to a magnitude of a control signal;
a control assembly; and
at least one flow sensor and at least one pressure sensor in communication with the control assembly, the at least one flow sensor and the at least one pressure sensor disposed between the control valve and the brake actuator and configured to measure a respective flow rate and pressure of the hydraulic fluid to the brake actuator;

wherein the control assembly is configured to ramp the control signal from a first signal level to a second signal level at a predetermined rate of change, the second signal level based on one or more of a predetermined stall flow rate threshold and a predetermined stall pressure threshold of the hydraulic fluid; and wherein the control assembly is configured to determine a flow-based position of the brake actuator based on the flow rate.

15. The vehicle of claim 14, wherein the control assembly comprises at least one controller.

16. The vehicle of claim 14, wherein the control assembly is configured to determine a maximum travel position of the brake actuator corresponding to the flow-based position of the brake actuator when the control signal is substantially equal to the second signal level.

17. The vehicle of claim 16, wherein the control assembly is configured to store the maximum travel position of the brake actuator.

18. The vehicle of claim 16, wherein the control assembly is configured to reposition the brake actuator to a zero torque position based on the maximum travel position.

19. The vehicle of claim 14, wherein the second signal level is defined by the control signal at a time the flow rate decreases below the predetermined stall flow rate threshold and the pressure is above the predetermined stall pressure threshold.

20. The vehicle of claim 14, wherein the control assembly is configured to integrate and normalize the flow rate.

* * * * *